United States Patent
Grasso et al.

(10) Patent No.: US 8,400,661 B2
(45) Date of Patent: Mar. 19, 2013

(54) VIRTUAL PRINTING CURRENCY FOR PROMOTING ENVIRONMENTAL BEHAVIOR OF DEVICE USERS

(75) Inventors: Maria Antonietta Grasso, Grenoble (FR); Victor Ciriza, Grenoble (FR); Jutta Katharina Willamowski, Grenoble (FR); Yves Hoppenot, Notre-Dame-de-Mésage (FR); Grégoire Gerard, Villeurbanne (FR); Mathieu Knibiehly, Villeurbanne (FR)

(73) Assignee: Xerox Corporation, Norwalk, CT (US)

( * ) Notice: Subject to any disclaimer, the term of this patent is extended or adjusted under 35 U.S.C. 154(b) by 77 days.

(21) Appl. No.: 12/851,685

(22) Filed: Aug. 6, 2010

(65) Prior Publication Data

US 2012/0033250 A1 Feb. 9, 2012

(51) Int. Cl.
*G06F 3/12* (2006.01)
*G06F 1/32* (2006.01)
*H04N 1/00* (2006.01)
*G06K 15/02* (2006.01)
*G03G 21/02* (2006.01)
*G01R 21/00* (2006.01)

(52) U.S. Cl. ....... 358/1.15; 358/401; 358/406; 358/501; 358/504; 399/24; 399/27; 399/28; 399/79; 705/400; 705/412; 713/320; 713/321

(58) Field of Classification Search .......... None
See application file for complete search history.

(56) References Cited

U.S. PATENT DOCUMENTS

| | | | |
|---|---|---|---|
| 7,072,066 B2 | 7/2006 | Guddanti | |
| 7,567,946 B2 | 7/2009 | Andreoli et al. | |
| 7,715,029 B2 * | 5/2010 | Kayahara | 358/1.13 |
| 2001/0026288 A1 * | 10/2001 | Shima | 345/764 |
| 2006/0089851 A1 * | 4/2006 | Silby et al. | 705/1 |
| 2006/0132826 A1 | 6/2006 | Ciriza et al. | |
| 2006/0206445 A1 | 9/2006 | Andreoli et al. | |
| 2007/0146772 A1 | 6/2007 | Castellani | |
| 2007/0182984 A1 * | 8/2007 | Ragnet et al. | 358/1.15 |
| 2008/0008508 A1 * | 1/2008 | Mizobuchi et al. | 399/389 |
| 2008/0069456 A1 | 3/2008 | Perronnin | |
| 2008/0137132 A1 * | 6/2008 | Perronnin | 358/1.15 |
| 2008/0174819 A1 * | 7/2008 | Hada | 358/1.15 |
| 2008/0300879 A1 | 12/2008 | Bouchard et al. | |
| 2009/0138878 A1 | 5/2009 | Fernstrom et al. | |
| 2009/0157510 A1 * | 6/2009 | Pridmore et al. | 705/14 |

(Continued)

FOREIGN PATENT DOCUMENTS

JP 2006-268324 * 10/2006

OTHER PUBLICATIONS

U.S. Appl. No. 12/773,165, Grasso, et al.

(Continued)

*Primary Examiner* — King Poon
*Assistant Examiner* — Beniyam Menberu
(74) *Attorney, Agent, or Firm* — Fay Sharpe LLP

(57) ABSTRACT

A system and method for promoting environmental behavior by device users are provided. The method includes allocating "green" points to each of a plurality of users. A job request, such as a print job request, is received from one of the users. A cost in points is computed for executing the job request, based on a formula which is designed to promote environmental behavior by the user. The user's allocated points are reduced by the computed cost when the job is performed.

12 Claims, 5 Drawing Sheets

U.S. PATENT DOCUMENTS

| | | | | |
|---|---|---|---|---|
| 2009/0195821 | A1* | 8/2009 | Matoba | 358/1.15 |
| 2009/0287806 | A1* | 11/2009 | Hamilton et al. | 709/223 |
| 2009/0313145 | A1* | 12/2009 | Hamilton et al. | 705/30 |
| 2009/0314837 | A1* | 12/2009 | Kataoka et al. | 235/385 |
| 2010/0027051 | A1* | 2/2010 | Hamilton et al. | 358/1.15 |
| 2010/0118329 | A1* | 5/2010 | Fujiki et al. | 358/1.14 |
| 2010/0145743 | A1* | 6/2010 | Colquhoun | 705/5 |
| 2010/0153176 | A1* | 6/2010 | Sussmeier et al. | 705/10 |
| 2011/0010571 | A1* | 1/2011 | Dance et al. | 713/323 |
| 2011/0310428 | A1* | 12/2011 | Ciriza et al. | 358/1.15 |

OTHER PUBLICATIONS

U.S. Appl. No. 12/328,276, Bouchard, et al.

U.S. Appl. No. 12/499,986, Dance, et al.

U.S. Appl. No. 12/512,209, Perronnin, et al.

Darby, S. "Why, what, when, how, where and who? Developing UK policy on metering, billing and energy display devices," in Proc. ACEEE Summer Study on Energy Efficiency in Buildings, Asilomar, CA, Aug. 17-22, 2008.

Csurka, et al. "Visual Categorization with Bags of Key-points," in *ECCV Workshop on Statistical Learning for Computer Vision* (2004).

Quelhas, et al. "Modeling Scenes with Local Descriptors and Latent Aspects," in *ICCV* (2005).

Carbonetto, et al. "A Statistical Model for General Contextual Object Recognition," in *ECCV* (2004).

Watchdoc—www.doxense.com/, accessed Jul. 7, 2010.

U.S. Appl. No. 12/819,437, Ciriza et al.

Coulter, et al., BMRB Social Research* and Glenn Lyons, Tim Chatterton and Charles Musselwhite, Centre for Transport & Society and the Air Quality Management Resource Centre, University of the West of England. "Exploring public attitudes to personal carbon dioxide emission information," Sep. 2007.

Sol Echanger Autrement—www.sol-reseau.org (Eng lang translation of web page), accessed Jul. 7, 2010.

Grasso, et al. "Who can claim complete abstinence from peeking at print jobs?" Proceedings of CSCW 2002, pp. 296-305.

Green Print www.printgreener.com/earthday.html accessed Jul. 7, 2010.

Conservatree: conservatree.org accessed Jul. 7, 2010.

US Environmental Protection Agency wvvw.epa.gov/otaq/climate/420f05004.htm#step1 accessed Jul. 7, 2010.

PrintAudit www.printaudit.com/ accessed Jul. 7, 2010.

Equitrac: www.equitrac.com/ accessed Jul. 7, 2010.

Salton, G., "Development in Automatic Text Retrieval," *Science*, 253, Aug. 30, 1991, 974-979.

Preo Printelligence: www.preosofiware.com/printelligence/solution.html accessed Jul. 7, 2010.

Honda Insight EcoAssist Nags Like a Backseat Hippie, Demo: automobiles.honda.com/insighthvbrid/fuel—efficiency.aspx accessed Jul. 7, 2010.

Autobloggreen, www.green.autoblog.com/2008/10/29/ford-smart-qauge-collects-green-leaves-for-good-behavior accessed Jul. 7, 2010.

Honda Insight EcoAssist Unifies Driver and Automobile for One Goal-Enhancing Efficiency—Demo: automobiles.honda.com/insight-hybrid/fuel-efficiency.aspx accessed Jul. 7, 2010.

EcoButton www.eco-button.com/uk/A2.1.home.htm accessed Jul. 7, 2010.

* cited by examiner

VIRTUAL PRINTING CURRENCY FOR PROMOTING ENVIRONMENTAL BEHAVIOR OF DEVICE USERS

CROSS REFERENCE TO RELATED PATENTS AND APPLICATIONS

Cross-reference is made to the following copending applications, the disclosures of which are incorporated herein by reference in their entireties:

U.S. application Ser. No. 12/819,437, filed Jun. 21, 2010, entitled SYSTEM AND METHOD FOR ENABLING AN ENVIRONMENTALLY INFORMED PRINTER CHOICE AT JOB SUBMISSION TIME, by Victor Ciriza, et al.

U.S. application Ser. No. 12/773,165, filed May 4, 2010, entitled SYSTEM AND METHOD FOR PROVIDING ENVIRONMENTAL FEEDBACK TO USERS OF SHARED PRINTERS, by Maria Antonietta Grasso, et al.

BACKGROUND

The exemplary embodiment relates to a system and method for promoting environmental behavior by users of electromechanical devices, such as printers, for execution of jobs. It finds particular application in conjunction with a network printing system in which multiple shared printers are available to users for printing their print jobs and will be described with particular reference thereto.

To improve operations, both in terms of environmental impact and cost, organizations such as companies, government organizations, schools, residential facilities, and the like, have attempted to promote a more environmentally conscious behavior in many areas of operation. However, to motivate users to change their habits in order to contribute to a collective objective is a complex matter, both at work and in society at large. The measures used in expressing environmental impact are difficult for users to grasp. The concept of a ton of carbon, for example, is meaningless to many people, both in terms of its size and the impact it may have on the environment. Additionally, employees may view a company's promotion of environmentally conscious behavior as merely a cost saving exercise.

In environments such as transportation and home energy consumption, consumers have been provided with environmental information in terms of $CO_2$ consumption (often referred to as the "carbon footprint"), which is widely accepted as a factor affecting climate change. The accurate association of $CO_2$ emissions with specific processes is complex, as the span of the processes and the factors involved are difficult to determine with precision. Experiments done in the UK with respect to home behavior concerning energy consumption have shown positive effects when the information is presented to the consumers by means of "smart meters" that facilitate the understanding of the current and temporal state of use (see, e.g., Darby, S. "Why, what, when, how, where and who? Developing UK policy on metering, billing and energy display devices," in Proc. ACEEE Summer Study on Energy Efficiency in Buildings, Asilomar, Calif. Aug. 17-22, 2008). There is no completely agreed upon definition of what a smart meter is. One widely-used definition introduced by the UK Industry Metering Advisory Group includes several dimensions which go beyond bare measurement of consumption. It includes "storing of measured data for multiple time periods" and "analysis of the data and a local display of the data in a meaningful form to the consumer". Still, it remains to be specified which data should be presented and which form of presentation would be meaningful to the consumer.

Standardization bodies, such as the ISO, address this issue through the creation of technical committees charged with the study of a certain process and determination of the carbon footprint associated with that process. In the area of printing, the ISO Technical Committee overseeing graphic technology standards (ISO TC 130) has initiated a committee for the printing and publishing industries. Currently, there is no standard method for measuring carbon footprint in this sector. Also, there is no consensus as to how to present this information to users in an effective way. $CO_2$ calculations may depend on how far one goes in the production chain. For example, when computing the amount of $CO_2$ consumed by a print job, it is difficult to estimate what account should be taken of the manufacturing process of the printer and the $CO_2$ it consumes, or the transportation costs of paper and ink. Further, these are environmental costs over which the end user may have little or no control.

Above-mentioned U.S. application Ser. No. 12/773,165 discloses a system and method for quantifying printer usage for review by a user. Data containing information related to a print job and community data relating to resource usage by members of a plurality of communities within a system are collected. A resource profiling component receives the marking engine data and the community data to evaluate resource usage by a user compared to one or more other users within their community. The system of Ser. No. 12/773,165 increases user awareness of printer usage by presenting the information graphically. However, this may not provide sufficient motivation to effect behavioral change.

Users often have some choice in the printers that they use and can select options, such as whether to print in black and white or color, the type of paper to use, and so forth. Additionally, they have a choice as to how many times a document is printed. Often, the behavior of users in their printing is not motivated by environmental concerns. They may select, for example, to print on the closest printer, use default settings, or print a document multiple times during its creation, simply as a matter of convenience. Additionally, the print-on-demand nature of most network printing systems may result in printers being woken up from a low energy sleep mode to an awake mode for printing a single document when the user requesting printing did not need the document immediately. As a result, consumables are used and power consumed by devices which may needlessly impact the environment.

The exemplary system and method promote environmentally-concerned behavior by users of such devices.

INCORPORATION BY REFERENCE

The following references, the disclosures of which are incorporated herein in their entireties by reference, are mentioned:

U.S. Pub. No. 20090138878, published May 28, 2009, entitled ENERGY-AWARE PRINT JOB MANAGEMENT, by Christer E. Fernstrom, et al., discloses a printing system and method for processing print jobs in a network of printers. The printers each have high and low operational states. A job ticket is associated with each print job. The job ticket designates one of the network printers as a target printer for printing the job and includes print job parameters related to redirection and delay for the print job. Where the target printer for the print job is in the low operational state, the print job may be redirected or delayed, depending on the parameters selected by the user.

U.S. Pub. No. 20060132826, published Jun. 22, 2006, entitled AUTOMATED JOB REDIRECTION AND ORGANIZATION MANAGEMENT, by Victor Ciriza et al., discloses mining job logs in order to compute a redirection matrix for managing operation of a plurality of systems. The redirection matrix may be used to identify alternative systems in the event a user selected system becomes unavailable to which a job may be redirected. In addition, the redirection matrix may be used to compute a network printer topology and print clusters for use with network management and system analysis.

U.S. Pub. No. U.S. Pub. No. 20060206445, published Sep. 14, 2006, entitled PROBABILISTIC MODELING OF SHARED DEVICE USAGE, by Jean-Marc Andreali, et al., discloses methods for estimating parameters of a probability model that models user behavior of shared devices offering different classes of service for carrying out jobs. In operation, usage job data of observed users and devices carrying out the jobs are recorded. A probability model is defined with an observed user variable, an observed device variable, a latent job cluster variable, and a latent job service class variable. A range of job service classes associated with the shared devices is determined, and an initial number of job clusters is selected. Parameters of the probability model are learned using the recorded job usage data, the determined range of service classes, and the selected initial number of job clusters. The learned parameters of the probability model are applied to evaluate one or more of: configuration of the shared devices, use of the shared devices, and job redirection between the shared devices.

U.S. Pub. No. 20080300879, published Dec. 4, 2008, entitled FACTORIAL HIDDEN MARKOV MODEL WITH DISCRETE OBSERVATIONS, by Guillaume Bouchard, et al., discloses a method for analyzing hidden dynamics, includes acquiring discrete observations, each discrete observation having an observed value selected from two or more allowed discrete values. An example of a networked printing system is used to demonstrate the applicability of the method.

U.S. application Ser. No. 12/328,276, filed Dec. 4, 2008, entitled SYSTEM AND METHOD FOR IMPROVING FAILURE DETECTION USING COLLECTIVE INTELLIGENCE WITH END-USER FEEDBACK, by Guillaume Bouchard, et al., discloses systems and methods that facilitate using end-user feedback to distinguish automatically between a normal behavior on a device and a device failure which can be a hard (machine detectable) failure or a soft failure.

U.S. patent application Ser. No. 12/499,986, filed Jul. 9, 2009, entitled PRINTER TIME-OUT, by Christopher R. Dance, et al., discloses a method of computing a time-out for a device includes acquiring data comprising a set of inter-arrival times for at least one device. This set of inter-arrival time values can be examined as the set of candidate time-outs. For each of a set of candidate time-outs, the method includes deriving a probability that an inter-arrival time from the set of inter-arrival times is greater than the candidate time-out. A cost function is computed, based on the derived probability and a robustness term and a time-out identified for the at least one device as the one minimizing the cost function value.

US Pub No. 20070146772, published Jun. 28, 2007, entitled AUTONOMOUS DECISION-MAKING IN PRINT JOB REDIRECTION, by Stefania Castellani, discloses a printing system which includes printers capable of redirecting print jobs to one another.

U.S. Pat. No. 7,072,066, issued Jul. 4, 2006, entitled SYSTEM AND METHOD FOR SAVING POWER USING PRIORITY PRINTING, by Guddanti, discloses a method and apparatus for saving power in a printing system, by prioritizing printer jobs.

BRIEF DESCRIPTION

In accordance with one aspect of the exemplary embodiment, a method for promoting environmental behavior by device users includes allocating points to each of a plurality of users, receiving a job request from one of the users and, with a processor of a computing device, computing a cost in points for executing the job request, based on a formula which is designed to promote environmental behavior by the user. The user's allocated points are modified to account for the computed cost.

In another aspect, a system for promoting environmental behavior by device users includes memory which stores, for each of a plurality of users, a virtual currency account comprising points allocated to a respective user. A virtual currency computation component receives information for a job request from one of the users and computes a cost, in points, for executing the job request, based on a formula which is designed to promote environmental behavior by the user. An account updater updates the user's virtual currency account to account for the computed cost. An interface generator is configured for generating an interface for presenting information about the user's virtual currency account. A computer processor implements the virtual currency computation component, account updater and interface generator.

In another aspect, a printing method includes: a) storing points allocated to each of a plurality of users in a respective virtual account, b) receiving a print job request from one of the users, c) with a processor of a computing device, computing a cost in points for executing the print job request, based on a formula which, for at least some of the users, takes into account whether the print job comprises a document or version of a document which has been previously submitted by the user for printing, d) updating the user's virtual account to account for the computed cost, e) generating a representation of the current status of the user's virtual currency account for presenting to the user, f) providing for repeating of b), c), d), and e) at least once, and g) providing for the user to redeem excess points in the virtual currency account for at least one option other than printing.

DETAILED DESCRIPTION

Figure 1:
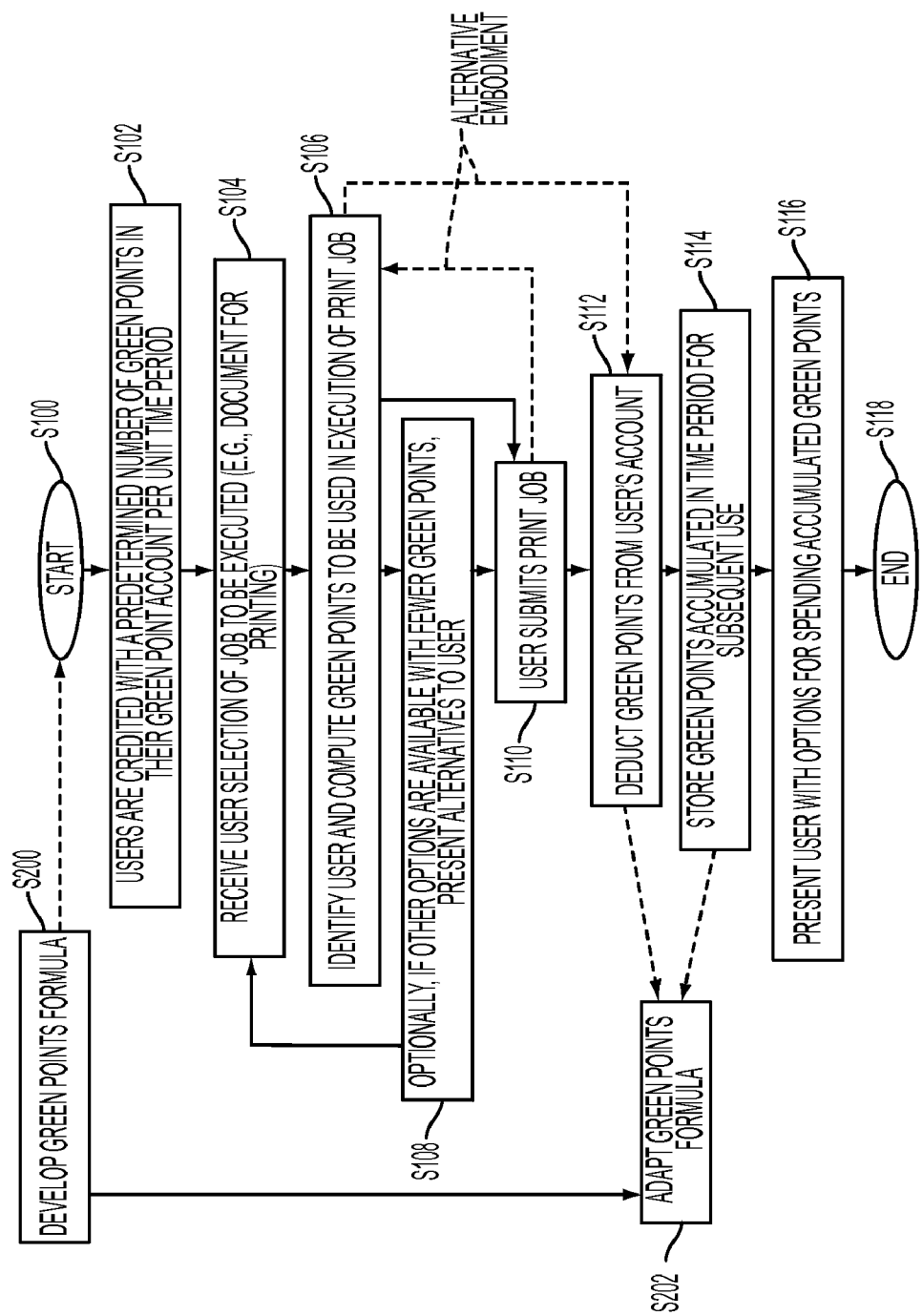
FIG. 1 is a flow diagram illustrating a method for promoting environmentally conscious behavior by users of a shared device or devices.

In various aspects, a green currency is established which is used to reward users of resources for their environmental behavior. The exemplary green currency is a virtual currency in that it is stored electronically in each user's green currency account. The account can be stored in memory, e.g., of a computing device, such as a server or network computer, or of a memory storage device, such as a stored value card. The account can be added to and/or subtracted from. In other embodiments, the green currency can be in tangible form, such as paper coupons, tokens, or the like.

The exemplary embodiment is described in terms of a network printing system, in which print jobs can be selectively directed from a workstation to one of a group of shared devices. The network devices are typically printers, copiers, or multifunction devices (MFDs), such as those with printing, copying and optionally faxing and email capability. Green currency is consumed, based on printer usage. It is to be appreciated, however, that the green currency is also applicable to the use of other shared resources where users have a choice as to how much use to make of the resource, while still performing their required job functions efficiently.

The term "printer," as used herein, broadly encompasses various printers, copiers, bookmaking machines, or multifunction machines, xerographic or otherwise, unless otherwise defined, which performs a print job rendering function for any purpose.

A "printer network," as used herein incorporates a plurality of shared devices, which are accessible to one or more workstations, such as personal computers.

The term "print medium" generally refers to a physical sheet of paper, plastic, or other suitable physical print media substrate for images, whether precut or web fed.

A "print job" generally includes a "printing object," which consists of one or more document images in a suitable format that is recognized by the printer, e.g., Postscript, together with a "job ticket," which provides information about the print job that will be used to control how the job is processed.

The exemplary green currency has units or "points" which are awarded to and/subtracted from users' accounts in amounts based on their behavior. For example, a user may be awarded a certain number of green points in a given time period, which are used up as the user makes choices about printing. Residual points at the end of the time period may be carried over to the next time period and/or may have a fixed lifetime, after which they automatically expire. In some embodiments, green points may be awarded for desirable behavior. Unlike other points-based systems, however, users are generally rewarded for their lack of consumption rather than for their consumption of goods or services. The exemplary green points can be saved or spent, with the choices of how they are spent being typically more limited than for conventional currency. In general, the green points are used for printing or other usage of electromechanical devices available to a group of employees. As an incentive to reduce usage of these shared resources, users may be permitted to designate residual points to some benefit for the user, the organization, the environment, or a combination thereof.

To promote printing which is beneficial for the organization, the green points used need not be directly proportional to the quantity consumed. Rather, they can be affected by behavior which the organization considers undesirable. For example, historical elements may contribute to make the "cost" of an action higher. In particular, reprinting of the same document may be penalized more heavily that the first time a document is printed. Green points may have at least some correspondence to the environmental costs of print actions. However, they need not be directly related to the carbon footprint of a job or other known method of measuring environmental impact, since a useful goal may be to promote an efficient work environment while reducing impacts upon the environment which can be readily avoided by promoting awareness to promote better behavior and translate positive actions into a rewarding mechanism. Additionally, environmental costs corresponding to the environmental impact of printing action in terms of $CO_2$ consumption are difficult to measure accurately, since devices tend to perform differently depending on their usage, and consumable supplies, such as inks, toners and paper, may have different carbon footprints based on their manufacturing and distribution methods. Thus, for print actions no generally accepted $CO_2$ consumption formula exists. Depending on the aim of the company, pursuit of reduced $CO_2$ consumption is not always the best measure to adopt. In various aspects, an aim of the proposed system and method may be to encourage employees to adopt environmentally-better print behavior. Therefore, a measure that does not reflect pure $CO_2$ consumption but rather emphasizes those aspects of print actions that are environmentally significant (e.g., in terms of $CO_2$ consumption) and that the individual employee can influence, is adopted. The exemplary system and method are sufficiently flexible to allow a corporation or other entity to devise a virtual printing currency motivating its employees to improve their environmental behavior.

The currency can also be adapted to different work environments within an organization. For example, the job functions of some employees may require them to do a large amount of printing, while others have more discretion on their printing habits. This latter group can thus be more heavily impacted by allocation of green points.

One advantage of the exemplary system and method with respect to conventional $CO_2$ calculators is that the system and method do not require computation of an accurate $CO_2$ consumption value. Another advantage of the exemplary system and method is that employees can be encouraged to engage in an environmental behavior without a direct link to money. Employees are often reluctant to participate in corporate actions if they feel that these are, in reality, motivated only by corporate financial savings. In various aspects, the corporation commits to corporate environmental actions. These actions may be made visible to the employees via the corporate web portal. The web portal may also be used by the employees to invest the green points they have saved through their individual green behavior in these corporate actions.

FIG. 1 illustrates an exemplary method of resource usage. The method begins at S100.

At S102, each user (e.g., an employee or group of employees) is credited with an appropriate quota of green points in their green point account per unit time period, such as daily, weekly, monthly, or annually. In the exemplary embodiment, not every employee within a corporation has the same amount of green points at his or her disposal. For example, some employees work will be inherently more environmentally costly than others. Marketing may inherently involve more printing, for example, than answering phone calls.

At S104, a planned resource usage is detected. For example, a user prepares to utilize a resource for performing a job, such as selection of a document for printing as a print job on a printer, which is received by the environmental system, as described in further detail below.

At S106, the green points to be deducted for that job are computed. (In some embodiments, this may be performed after the job has been submitted, e.g., after S110). In some embodiments, the user may be provided a warning if, based on the usage so far, he is expected to exceed his allocation of green points (and any green points carried over from a prior period) for a given time period. This reminds the user to be careful in his printing, so that his green points allocation is not exceeded.

Optionally, at S108, the user may be provided with other options for performing the job which utilize fewer green points. Or, this may be provided after the print job has been executed (e.g., after S112), so that the user can see why the particular number of green points were deducted and take the options for green point saving into account when submitting a future job for execution.

At S110, the user submits the job for printing.

At S112, when the job has been submitted or completed, the user's green point account is updated to reflect the green points used for that job, e.g., the green points computed for that job are deducted from the user's green point account. The information is displayed to the user, and optionally to other recipients, such as an administrator. If the user's account does not have sufficient points for completing the job, the user and/or an administrator may be alerted. In some embodiments, printing may be suspended until the user is authorized to exceed his allotted green points. This embodiment may place a hard constraint on user behavior. Or, in some embodiments, the user's account may be allowed go negative, at least for a while. In other embodiments, trading of green points between users may be permitted, provided that this does not conflict with the overall goals of the organization.

At S114, in one embodiment, green points that are not spent within the corresponding time period can be accumulated in the user's green point account and rolled over to a subsequent time period.

At S116, accumulated green points may be spent in a later time period, e.g., by selection of one or more options (other than for printing) which is/are provided by the green point issuer, e.g., a company or other entity owning or managing the resources. When the user elects to spend some of his accumulated green points on one of the available options, the green points are deducted from his account and appropriate action is initiated to effect the user's choice of options.

The method ends at S118. As will be appreciated, steps S104-S112 may be performed each time one of the users submits a job for execution.

Figure 2:
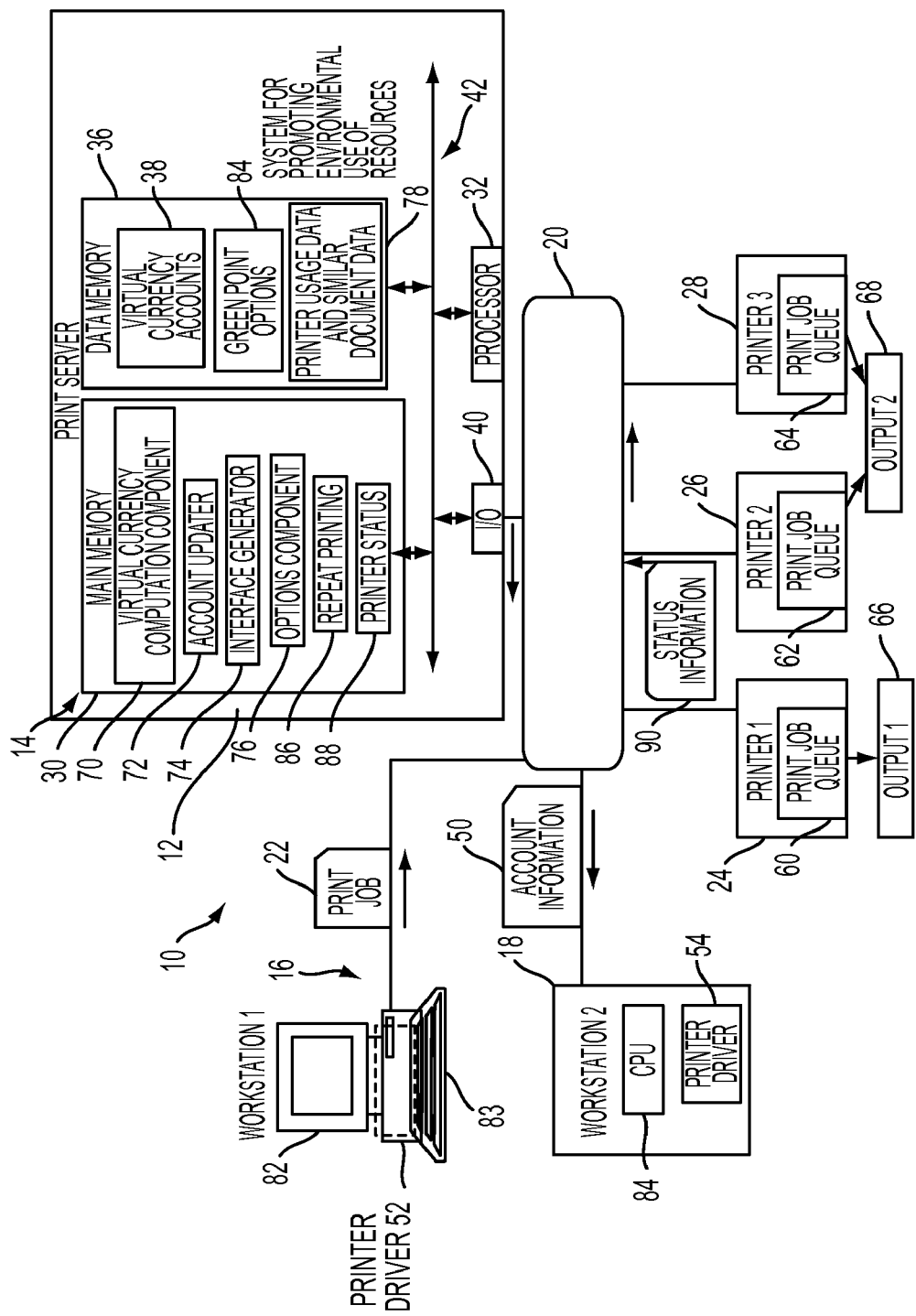
FIG. 2 is a functional block diagram illustrating a system for promoting environmentally conscious behavior by users of a shared device or devices.

FIG. 2 illustrates an exemplary network printing system 10 in which the method of FIG. 1 may be performed. The printing system 10 hosts a system 12 for promoting environmental use of resources ("environmental system"). The exemplary environmental system 12 may be resident on a server computer 14 communicatively linked to one or more workstations, here illustrated as first and second workstations 16, 18, by a wired or wireless network 20, although other locations for the environmental system 12, within the printing network or accessible thereto, are contemplated. The server computer 14 may be a print server which receives print jobs 22 from the work stations 16, 18 via the network, and allocated them to one or more of a set of network printers here illustrated as first, second, and third printers 24, 26, 28. The exemplary server computer 14 includes main memory 30, which stores software instructions for performing the exemplary method, in addition to the allocation of print jobs, and a computer processor 32, in communication with the main memory 30, for executing the instructions. Data memory 36, resident on the server 14 or in communication therewith, stores a set of virtual currency accounts 38, each of which stores the current total of green points of a user. This total may be separately stored as residual green points from prior time periods and residual green points from the current time period.

The server computer 14 includes one or more inputs/outputs 40, for communicating with the workstations 16, 18 and networked printers 24, 26, 28, e.g., via network 20. Components 30, 32, 36, 40 of the computer may communicate via a data/control bus 42.

The environmental system 12 tracks usage of a virtual currency by users of the system 10 and provides the users with information 50 on their respective virtual currency account 38. The information 50 may be made available permanently on the user's screen and/or when the user is about to launch a print job. The information is made available to the user through a graphical user interface, e.g., on his workstation 14, 16, for example, using readily understood icons and other graphical representations.

Each workstation 14, 16 is associated with a respective printer driver 52, 54, which generates print jobs 22. Print jobs 22 generated by the user through an interface generated by the respective printer driver 52, 54 are received by the input/output 40 to the print server 14, via the network 20. The print jobs 22 arriving from the plurality of workstations 16, 18 are directed by the server 14 to one or more appropriate printers 24, 26, 28 for printing in accordance with their job tickets. The printers 24, 26, 28 place the print jobs 22 in their respective print queues 60, 62, 64. The printers 24, 26, 28 render the print jobs 22 on print media using, for example, inks or toners, and output the printed media to one or more output devices, such as finishers, trays, or the like, here illustrated as outputs 66, 68.

Figure 3:
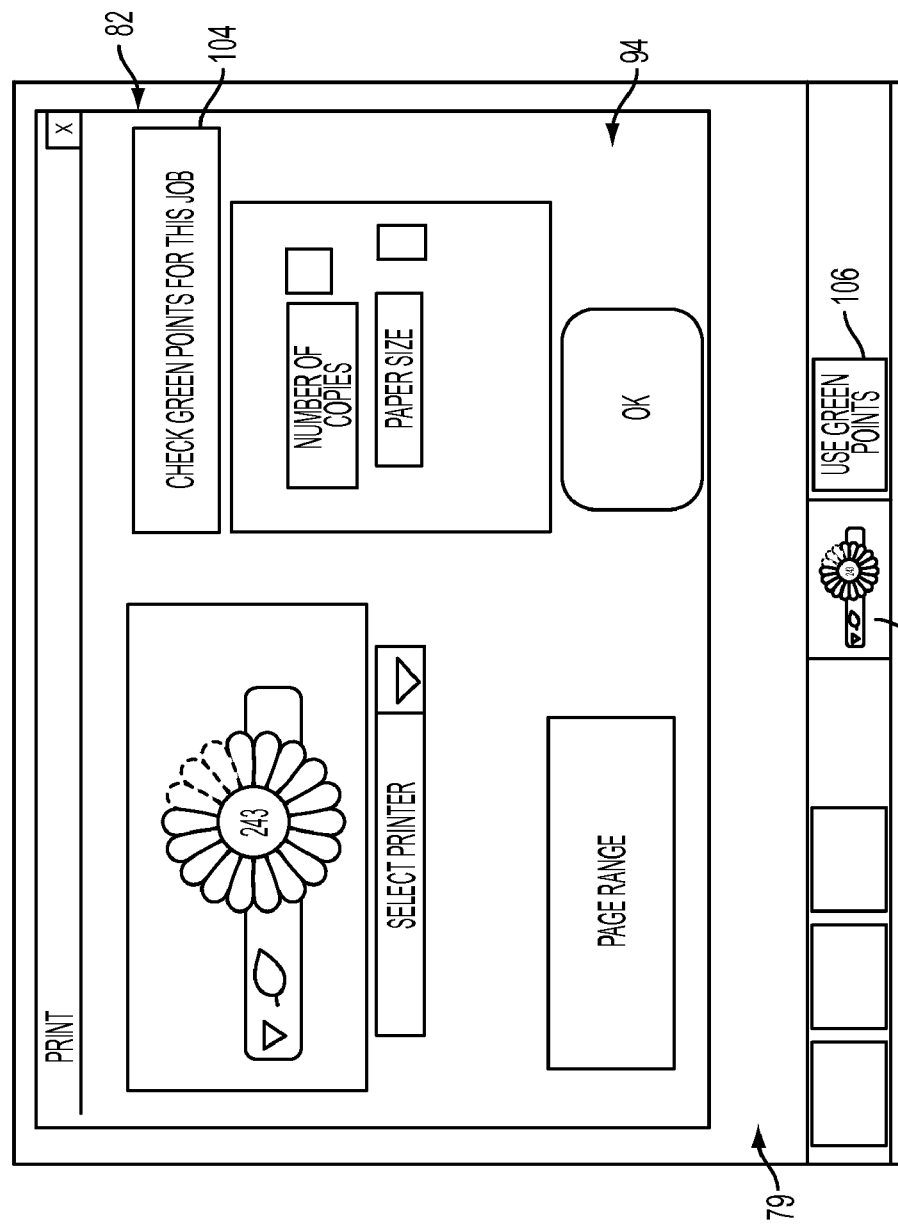
FIG. 3 is an illustrative screenshot of an interface for displaying usage of green points in the context of a print job.

The environmental system 12 includes various components for implementing the exemplary method of FIG. 1. These components include a virtual currency computation component 70, an account updater 72, an interface generation component 74, and an options component 76. The virtual currency computation component 70 computes the number of green points which will be used for a submitted print job (at S106), based on a predetermined computation formula, the print job submitted, and the user's printer usage data 78 (e.g., stored in memory 36), as described in further detail below. The account updater 72 updates the user's account to reflect the green points used, if any, in performing a particular print job (at S112), or when additional points are added or residual points spent. The interface generation component 74 generates an interface 79 for presenting information about the user's virtual currency account. For example, the component 74 generates a representation 80 (FIG. 3) of the current status of the user's green point account 38 for presenting to the user (visually or aurally) on the workstation, e.g., via a display device 82, such as an LCD screen or other display screen. The exemplary representation is a permanent widget, which is sent to a user to display a permanent rendering that is commensurate with the user's account status. When a print job has been executed, the widget 80 is modified to reflect the number of green points that have been deducted for performing that job. The user may interact with the interface 79 using a user input device 83, such as a keyboard, touch screen, cursor control device, or the like. The options component 76 generates an interface for displaying options for using residual green points to be displayed to the user, based on a set of options 84 stored in memory 36, and the accumulated green points in the account 38 that are available for spending.

The printer usage data 78 may include the history of print jobs printed by the user, e.g., over a predetermined time period such as a day or week. This information may be received from the workstation or extracted by the printers or server from print jobs submitted to the printers. Data acquired from the printers may also be used for identifying copy jobs, which have not been sent from the workstations, but which are associable to the user by a user ID input at the time the copy is made. Green points for copy jobs can thus also be computed and deducted from the user's allocation, but may use a different, e.g., more limited formula for computing them.

The system 12 may include or utilize a repeat printing component 86 for determining, from the accumulated data 78, when the same or a similar document has been previously printed and the number of times it has been reprinted. The type of job printed may also be recorded, such as email, text document, PowerPoint™, etc. In instances where the documents are being retrieved from a document management system, the determination of whether the same or a similar job has been printed by a user may be achieved at least partly by comparing document file paths. Alternatively or additionally, in this or other cases, such as with email attachments, the content of the document to be printed and that of prior documents printed by that user may be compared and a measure of their similarity computed. For example, each document sent to the printer (e.g., over the course of a day or other time period) is decomposed into words and a histogram of words is generated for at least some of the words. For example, a histogram of frequencies of use of a set of words in the document may be generated for a current document and is compared with the previously generated and stored histograms for documents submitted by the same user. Documents with at least a first threshold of similarity, based at least in part on the histogram similarity, may be considered to be versions. Documents with at least a second, higher threshold of similarity, based at least in part on the histogram similarity, may be considered to be the same document. Other factors may also be considered in determining whether a document is the same or similar, such as the document length (e.g., number of words), the type of document, and the like. In other embodiments, no distinction is made between whether the document is a version of a document or the same document as one previously printed—both are treated as repeats and penalized by some appropriate factor in computing the green points.

Similarity measures may also be used for determining whether images sent for printing are similar or the same. For example, this may be achieved by comparing image signatures which are representative of an image, while requiring storage of less data than the entire image. The signature may be in the form of a vector. Two signatures may be compared by comparing their cosine functions. For exemplary methods for computing image signatures, see for example, U.S. Pub. No. 20080069456 to Jegou, et al.; U.S. application Ser. No. 12/512,209, filed Jul. 30, 2009, entitled COMPACT SIGNATURE FOR UNORDERED VECTOR SETS WITH APPLICATION TO IMAGE RETRIEVAL, by Florent Perronnin and Hervé Poirier, and references cited therein; Csurka, G., Dance, C., Fan, L., Willamowski, J., and Bray, C., "Visual Categorization with Bags of Key-points," in *ECCV Workshop on Statistical Learning for Computer Vision* (2004); Quelhas, P., Monay, F., Odobez, J.-M., Gatica-Perez, D., Tuytelaars, T., and Gool, L. V., "Modeling Scenes with Local Descriptors and Latent Aspects," in *ICCV* (2005), and Carbonetto, P., de Freitas, N., and Barnard, K., "A Statistical Model for General Contextual Object Recognition," in *ECCV* (2004). Image signatures may also be used for computing similarity between two copy jobs.

As further described in copending application Ser. No. 12/819,437, the environmental system 12 may have access to tools for determining the current and future status of available printers and optionally for mining printer usage data to identify a set of printers favored by a user. In particular, the system 12 may include a printer status computation component 88, which receives status information 90 from the printers 24, 26, 28, which allows the system to determine if they are currently awake (i.e., ready for printing) or asleep (i.e., need to be woken up before printing, which involves energy costs in the wake-up procedure). For a printer which is currently asleep, the printer status computation component 88 of system 12 may determine when it will wake up next (assuming that it is not prompted to do so by an arriving print job). This determination may be based on the printer's stored wake-up schedule and/or thorough observations of printer behavior. The status of the printer selected for printing a print job can thus be taken into consideration in computing the cost, in green points, for printing the job and/or for proposing one or more alternate printers with a lower green points cost (e.g., because they are currently awake or about to awaken, or because the green points for using that printer are set lower).

While all of the processing components 70, 72, 74, 76, 86, 88 are shown as being resident on the print server 14, it is to be appreciated that some or all of the components or parts thereof may be located elsewhere in the network, such as on the workstations 16, 18, and/or may be accessible to the server 14, e.g., via a web link. The components 70, 72, 74, 76, 86, 88 may be in the form of hardware or a combination of hardware and software. In the exemplary embodiment, components 70, 72, 74, 76, 86, 88 are in the form of instructions stored in memory 30, which are executed by associated processor 32.

The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

The memories 30, 32 may be separate or combined and may represent any type of non-transitory computer readable medium such as random access memory (RAM), read only memory (ROM), magnetic disk or tape, optical disk, flash memory, or holographic memory. In one embodiment, the memory 30, 32 comprises a combination of random access memory and read only memory.

The digital processor 32 can be variously embodied, such as by a single-core processor, a dual-core processor (or more generally by a multiple-core processor), a digital processor and cooperating math coprocessor, a digital controller, or the like. The digital processor 32, in addition to controlling the operation of the computer 14, executes instructions stored in memory 30 for performing the method outlined in FIG. 1 and further described below.

The exemplary print server 14 may include one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like.

Workstations 16, 18 may each be a PC, such as a desktop, a laptop, palmtop computer, portable digital assistant (PDA), server computer, cellular telephone, pager, or other computing device capable of generating print jobs and displaying or otherwise presenting account information 50 to the user. In some embodiments, a work station may serve as the print server 14 and host environmental system 12.

The network 20 may be in the form of wired or wireless links or other means capable of supplying or communicating electronic data to and/or from the connected/linked elements. For example, the links between elements can be telephone lines, computer cables, ISDN lines, wireless communication links (e.g., employing Bluetooth™ wireless technology), or the like. The network 20 can be a local area network or a wired area network, such as the Internet. In other embodiments, the workstation may include or be directly linked to an associated printer.

Printers 24, 26, 28 may be electrophotographic printers, ink-jet printers, solid ink printers, thermal head printers used in conjunction with heat sensitive paper, or combinations or multiples thereof, or any other device capable of marking an image on a substrate. In general a printer includes an image rendering component, which applies marking materials, such as inks or toners, to print media, and optionally a fixing component, which fixes the applied marking materials more permanently to the print media. Each of the printers may be associated with a source of print media, such as a paper feeder (not shown), which may include one or more print media supply trays, each tray holding sheets of print media of a different type.

The method illustrated in FIG. 1 may be implemented in a non-transitory computer program product that may be executed on a computer. The computer program product may be a tangible computer-readable recording medium on which a control program is stored, such as a disk, hard drive, or the like. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 1, can be used to implement the method for managing a virtual account for use of shared resources.

Further details on the system and method will now be described.

Formula for Computing Usage of Green Points

The exemplary formula for green point usage ("cost") that is utilized by the computation component 70 at S106 or S112 can be devised and adapted based on the needs of the utilizing organization (e.g., corporation) and the various user (e.g., employee) environments and actions occurring at the work place. The green point formula allows the various aspects of an action that have a non-negligible environmental impact to be taken into consideration. However, rather than trying to provide an accurate computation of the impact, the formula attributes higher values to those aspects that the individual employee can influence personally, i.e., where he can reduce his environmental impact. The aim is to encourage employees to optimize their behavior wherever it is reasonably possible for them to do so and at the same time, where it is worthwhile in terms of impact.

The exemplary formula is designed to promote environmental behavior by the user, such as reducing the number of times a document is printed, encouraging double sided or n-up printing, avoiding using a printer which needs to be woken up, selecting a printer which has a lower computed environmental cost in terms of energy usage and/or consumables, and combinations thereof, by favoring these options, where they are available, with a lower points consumption than for other choices that are considered to be less environmental. The formula may be specific to a user or group of users.

The exemplary green points formula is not based solely on the size of the job (i.e., the total number of pages printed, in the case of a print job), but also takes into account other factors.

The exemplary formula for computing the green points takes as a cost basis, one green point per page printed and penalizes the user through deduction of additional green points (or portions thereof) for the page or entire job, based on variables which are selected to promote environmental behavior. In other embodiments, the formula may include variables for rewarding the user by adding green points for selecting particular variables. These rewards may be structured such that the cost of a job, in green points, is always a positive number and thus the account is reduced with each print job.

Typical variables influencing the environmental impact of performing a print job which may be taken into consideration by the green points formula in computing the green points to be deducted for a print job may be selected from the following: 1. Print job volume; 2. Selected Print job settings; 3. Document Content; 4. Printer Characteristics; and combinations thereof. Other variables can also be considered in the formula.

The print job volume can be set as the document length times the number of copies printed in the job.

Exemplary print job settings which may be used in the formula may include one or more of:
  a. quality, e.g., paper type, with higher quality paper being accorded a higher cost;
  b. parameters affecting number of paper sheets used for printing the document, e.g., duplex printing (two pages per sheet) may be accorded a lower cost than simplex printing (printing on one side of the sheet only); n-up printing, where multiple pages are printed on the same side of a sheet, may be accorded lower cost than one page per sheet side; usage of a banner sheet before the document may be accorded a higher cost.

Exemplary document content parameters which may be used in the formula may include one or more of:
  a. coverage: how much of each page is printed, which can be affected by whether the document includes images or text and in the case of images, the dpi value selected;
  b. reprint: whether the document has been previously printed by that user in a given time period, even if it has been modified. This encourages users to limit the number of times a document is reprinted during its preparation. In other embodiments, the system may penalize reprinting only in the case of identical documents.
  c. document type: black and white may be accorded a lower cost than color-containing print jobs; documents containing images may be accorded a higher cost than documents with no or only a small proportion of images.

Exemplary printer characteristics which may be used in the formula may include one or more of: energy consumption, e.g., per page, assuming that the selected printer is in an awake status; environmental costs associated with consumables for that printer such as inks and toners, (e.g., where different printers may be associated with different consumables); and printer status, e.g., awake or asleep.

A printer typically receives an incoming print job and places it in a queue with other print jobs and then prints them in order. Since demands for printing vary over time, the printers typically have two or more modes in which the printer is either capable of printing or capable of being automatically raised to a mode in which it is capable of printing. A printer may thus have at least two modes which consume power including a ready mode, in which the device is ready for printing, and a stand-by or automatic power saving mode. Generally, when the printer has been idle for a certain period of time, it automatically goes into the stand-by mode, with reduced power consumption. The wake-up process can be quite lengthy. Some printer models therefore provide different levels of "readiness" to maintain an acceptable balance between power consumption and wake-up time, and in some cases they provide self-adaptive power-mode management by measuring the daily periods when printers are typically being used, in order to anticipate the wake-up and the transition to ready mode.

The environmental costs (and hence the green points deducted) are generally lower in the case of a printer which does not need to be woken up to perform the print job. For certain printers, the difference in power consumption between stand-by (asleep) and ready to print (awake) modes is significant. For example, in the case of printers using solid ink technology, the ink is melted to convert it from a solid to a liquid prior to printing. In the ready mode, the ink is maintained at an increased temperature level, resulting in higher power consumption. The warm-up from stand-by to ready mode involves significant energy consumption to melt the solid ink and also consumes ink to clean the print heads. Electrographic (laser) printers also consume less energy in the standby mode, for example, by turning off power to agitators in the developer housing which keep the toner particles and carrier particles mixed.

Once the warm-up has been completed, the printer is ready for operation and starts printing. When printing ends, the printer may enter an idle (awake) state where, in the case of solid ink printers, the ink is maintained in liquid form. If no new print job is submitted to the printer, it will eventually return to its stand-by mode.

In a first step preliminary to performing the exemplary method (FIG. 1, S200), a global green point's formula integrating some or all of these variables is devised. This formula can then be adapted (S202) to the working environment of a corporation and its employees by selecting variables to consider and adjusting the corresponding costs. To make the formula easily graspable for the users, the basic cost of each printed sheet can be set to one green point (1 GP), which can be modified by the parameters above.

Per print job there may then be different types of costs beyond the basic cost of 1 GP per printed sheet:
 1. Job length independent costs,
 2. Job length proportional costs (per printed sheet),
 3. Costs for printed pages with particular characteristics (nearly empty/nearly fully covered pages).

The following exemplary green points formula illustrates exemplary parameters and costs which may be involved in the global green point's formula. Table 1 provides a description of each of the parameters $$C_{job} = C_{jobIndependent} + C_{jobLength} + C_{jobCharacteristics}$$

where:

$$C_{jobIndependent} = [I_{bs}*C_{bs} + I_{wu}*C_{wu}]$$
$$C_{jobLength} = [N_{pages}/PPS*(1GP + N_{reprt}*C_{reprt} + N_{sml}*C_{sml} + C_{tp} + C_{qlt} + C_{cons})]$$
$$C_{jobCharacteristics} = [N_{ep}*C_{ep} + N_{dp}*C_{dp}]$$

TABLE 1

| Symbol | Parameter |
|---|---|
| $C_{job}$ | Total cost of the job (all costs are measured in green points) |
| $C_{jobIndpendent}$ | All job length independent costs |
| $C_{jobLength}$ | All job length proportional costs |
| $C_{jobCharacteristics}$ | All costs for particular pages with particular characteristics |
| $I_{bs}$ | Indicator of banner sheet (e.g., 0 if there is no banner sheet, 1 if there is) |
| $C_{bs}$ | Cost of banner sheet |
| $I_{wu}$ | Indicator of printer wake up required to complete the job (e.g., 1 for a printer which is asleep, 0 for a printer which already awake, i.e., is ready for printing) |
| $C_{wu}$ | Cost of printer wake up |
| $N_{pages}$ | Number of pages of the printed document |
| PPS | Number of pages printed per sheet (e.g., 2 for duplex), which may be implemented only in the case where the document includes more than one page |
| $N_{reprt}$ | Number of times the document has already been printed |
| $C_{reprt}$ | Cost of the reprint (the cost per reprint may increase, e.g., double, with each successive reprint) |
| $N_{sml}$ | Number of times that a very similar document has already be printed (e.g., a previous version of the same document) |
| $C_{sml}$ | Cost of printing document versions (the cost per reprinting versions may increase, e.g., double, with each successive reprint) |
| $C_{tp}$ | Cost for printing document type (different costs can be defined for different types of documents, e.g., ppt/email/text/image) |
| $C_{qlt}$ | Cost of selected quality level (if different quality levels are to be considered corresponding costs are defined, such as draft mode vs. quality mode affect how much ink or toner is used in printing the document) |
| $C_{cons}$ | Cost of consumable (if different consumables are to be considered corresponding costs are defined, such as type of paper selected, ink vs. toner) |

TABLE 1-continued

| Symbol | Parameter |
|---|---|
| $N_{ep}$ | Number of empty or nearly empty pages (e.g., coverage <1%) |
| $C_{ep}$ | Cost of (nearly) empty pages |
| $N_{dp}$ | Number of (nearly) fully-covered pages (e.g., coverage >90%) |
| $C_{dp}$ | Cost of (nearly) fully covered pages |

As each job is sent to the system 12, information for computing the values of the above parameters (or those which have been selected for use in the formula) is computed and the information, or a representation of the information may be stored, e.g., as metadata. When the job is performed, the exact cost of the job can be computed based on the stored information.

The parameter $C_{ep}$ serves as an added incentive (above that of the number of pages) to encourage users to reduce the number of pages printed where it would be expected that they could reformat the job to cover at least one less page, and thus save on the environmental cost of paper. The parameter $C_{dp}$ serves as a disincentive to print pages with high coverage, such as images, graphics, and Powerpoint™ backgrounds which consume a lot more ink or toner than text documents. Coverage may be determined by various means, such as by determining the percentage of the pixels which are on for at least one colorant.

When deploying the system 12 within a particular organization, this basic formula can be adapted by the administrative user to the different work environments. For example, this may include selecting which parts/variables of the formula should be included. Different formulas can be developed for different users or groups of users. Elements of the formula that cannot be computed in the environment can be excluded. For example, if the infrastructure does not allow detection of similar documents then the corresponding costs are not accessible for inclusion in the formula. It may also include defining the corresponding costs involved in terms of GPs (for example, costs for different document types, printer wake up, etc.). One behavior may be penalized more than another. For example, a lower cost penalty may be incurred for printing a new version of a document than for printing the same document. The formula can then be tested on typical print jobs to evaluate how much they would cost and how many GPs should be allocated to the employees in a given time period.

The formula to compute cost of print jobs can be adapted to different work environments to penalize the employees (use more green points) only where it makes sense, e.g., as follows:

1. Penalizing particular tasks depending on the type of work done. For example, employees working in marketing may need to print the same document numerous times as part of their job function. Thus, they may not be penalized for this behavior, or penalized less than employees in other environments, such as research, where a single printing of a document is more likely to be the norm. Similarly, banner sheets may be necessary where a large number of users share a printer, but not so where only very few users share one. Thus, users may be penalized less or not at all for banner sheet printing where a large number of users share a printer, than when one or only a few users share the same printer.

2. Penalizing inappropriate use of the print network 10. For example, if the user cannot be advised of, or readily determine, whether a printer is awake or not, penalizing the user for waking it up serves no benefit, since the user has no choice in whether to wake up the printer. Similarly, if there is only one print queue available, penalizing users for using the corresponding consumables serves no benefit, as the user has no choice in the selection of consumables (by selecting a different printer).

The usage of the printers by the various users may be studied in a period prior to implementing the green points method, to obtain a sense of how many green points should be provided to each user. Then over time, the number of green points allocated to a user may be reduced per time period, as users become more familiar with ways of improving their environmental behavior.

Presentation to the User

In the exemplary embodiment, various interface elements allow simplifying and embedding the green point process into the day-to-day life of users. In one embodiment, a variable icon, such as widget 80 (FIG. 3), may be made available on the user's screen 82, e.g., visible on the computer's desktop at all times, not only when the print menu 94 is displayed. The exemplary widget 80 shows the user how many green points that user has spent since the beginning of the month (corresponding to the missing leaves) and how many he can still spend until the end of the month (displayed number). This widget serves as a reminder to the user not to waste too much by printing.

A second user interface element is a visual real time feedback which may be in the form of a popup 96 (FIG. 4), which is made available when the user has submitted his job to a printer, or prior to doing so. This element 96 can have two roles. The first is in showing the user how the cost of his action in terms of green points compares with the cost of the same job with optimized (default green) settings, as shown, for example, side by side at 98 and 100, respectively. The user can thus easily compare the cost of his action with the optimized one.

The second role is in informing the user about his settings and habits that can be improved. In one example, the user can substitute simplex for duplex printing, color for black and white printing, lower quality stock for higher quality stock, avoiding repeat printing, and make other choices that will limit resource usage, and therefore environmental impact, caused by their behavior. If the print job was particularly costly, this interface 96 can include a message 102 to the user explaining the main reasons for this cost and suggesting better ways of printing. For example, if there are two available printers, one with a lower environmental cost than the other, the message displayed may be: "This print job was particularly costly because you selected printer X. Using printer Y would have reduced the cost by Z."

By computing green points according to the work environment, some major improvements can thus be identified by the system 12 and suggested to the user for his future print actions.

Figure 4:
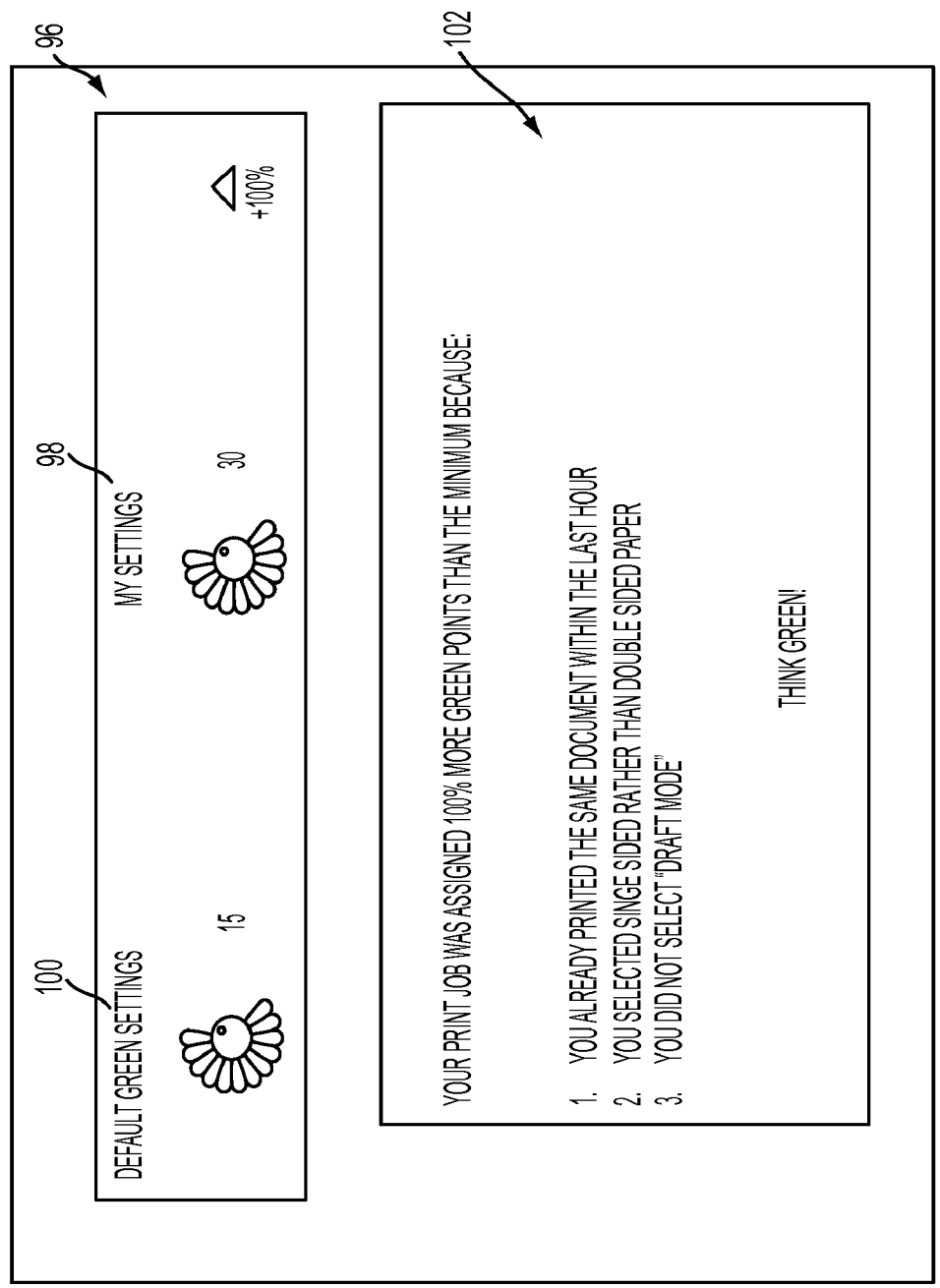
FIG. 4 is an illustrative screenshot of an interface for displaying a comparison between user and default consumption of green points in the context of a print job.

In some embodiments, the user may check on the green points for a print job not yet submitted, e.g., by actuating a "check green points" icon 104 on the print menu (FIG. 3), which brings up a screen analogous to that shown in FIG. 4. In this embodiment, the user can see how he may modify his behavior before submitting the job for printing.

Figure 5:
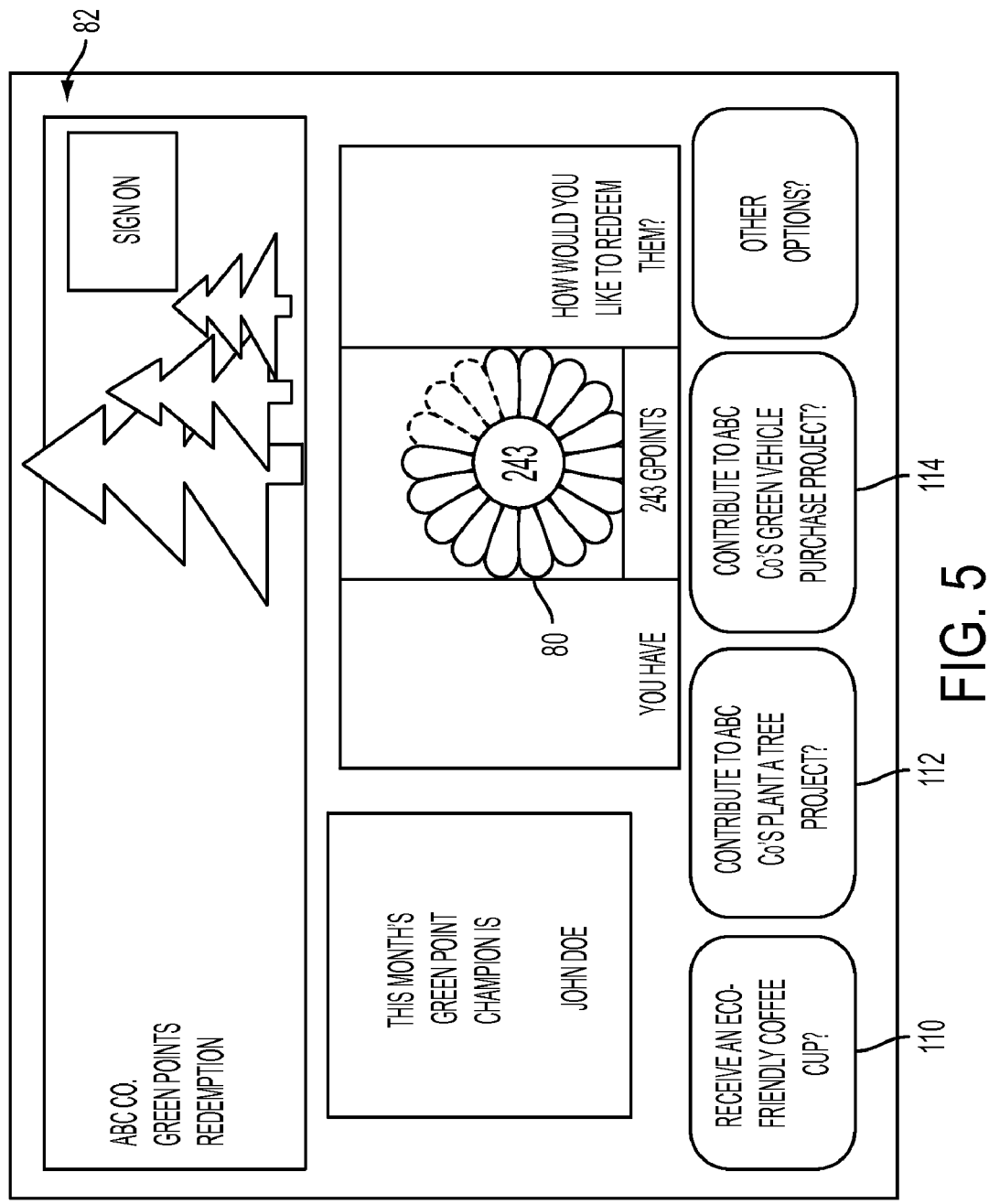
FIG. 5 is an illustrative screenshot of a corporate website for displaying opportunities for redeeming excess green points.

A third user interface is a corporate web site where the user can authenticate himself and access the green points he has saved over the past time periods. For example, the user's screen may display an icon 106, e.g., on the workstation's desktop (FIG. 3), which, when actuated, by clicking on it, for example, opens the web site home page of an internal part of the website which is accessible to the employees. The web site allows the user to invest these savings in green gifts 110 or actions 112, 114, as illustrated by way of example in FIG. 5. Such options act as an award for the user's effort in sustainable development. Gifts 110 can be placed in the office environment (e.g., on top of the desk), visible by colleagues and showing that the user takes actively part in the corporate green initiative.

Corporate "green" actions may also be advertised on the public part of the corporate web site. They are visible to everyone and publicize the corporate effort and the employees' total contributions. Since the corporation offers these actions, it shows its "green" engagement and enhances its image.

Employees can spend saved green points from their account at a later time in various ways. They can spend them for carrying out usual job-related actions (when exceeding the number of green points granted for the current time period), to donate for corporation specific environmental actions, or to compensate for other personal environmentally costly actions, etc.

As examples, the options selectable by the employees for spending their accumulated green points may be environmentally related, such as investment in a corporate-sponsored project which benefits the local community, such as planting trees, environmental cleanup, or the like, or may be a more global project, such as purchasing carbon offsets, purchasing land designated for environmental purposes, or the like. The organization's commitment to these environmental actions may be publicized to its employees and the outside world e.g., through a public Web site, which may provide the possibility for the employees to invest their saved green points in those actions. Employees may also be able to select charities to which a donation will be made on their behalf using a suitable conversion rate for green points to dollars, which are then donated by the organization. The employees may be permitted to spend some or all of their accumulated green points on personal rewards, such as extra vacation days, traveling to work by car, or on tangible or monetary gifts.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer program product comprising a non-transitory recording medium storing instructions, which when executed on a computer causes the computer to perform a method comprising:
   a) storing points allocated to each of a plurality of users in a respective virtual account;
   b) receiving a print job request from one of the users;
   c) with a processor of a computing device, computing a cost in points for executing the print job request, based on a formula which, for at least some of the users, takes into account whether the print job comprises a document or version of a document which has been previously submitted by the user for printing and takes into account whether a printer selected for printing is asleep or is awake, and if asleep, a cost of waking up the printer;
   d) updating the user's virtual account to account for the computed cost;
   e) generating a representation of the current status of the user's virtual currency account for presenting to the user;
   f) providing for repeating of b), c), d), and e) at least once; and
   g) providing for the user to redeem excess points in the virtual currency account for at least one option other than printing.

2. A printing method comprising:
   a) storing points allocated to each of a plurality of users in a respective virtual account;
   b) receiving a print job request from one of the users;
   c) with a processor of a computing device, computing a cost in points for executing the print job request, based on a formula which, for at least some of the users, takes into account whether the print job comprises a document or version of a document which has been previously submitted by the user for printing and takes into account whether a printer selected for printing is asleep or is awake, and if asleep, a cost of waking up the printer;
   d) updating the user's virtual account to account for the computed cost;
   e) generating a representation of the current status of the user's virtual currency account for presenting to the user;
   f) providing for repeating of b), c), d), and e) at least once; and
   g) providing for the user to redeem excess points in the virtual currency account for at least one option other than printing.

3. The method of claim 2, wherein the formula takes into account a number of times that the similar document has been previously printed, the cost being higher when a similar document is identified which has already been printed more than once than when a similar document is identified which has already been printed only once.

4. The method of claim 2, wherein the formula takes into account at least one parameter of:
   print job volume;
   user-selectable print job settings;
   document content; and
   printer characteristics.

5. The method of claim 4, wherein the formula takes into account print job volume parameters, the print job volume parameters including at least one of print job quality and parameters affecting a number of paper sheets used for printing the document.

6. The method of claim 4, wherein the formula takes into account user-selectable print job settings, the user-selectable print job settings including at least one of print job quality and parameters affecting a number of paper sheets used for printing the document.

7. The method of claim 4, wherein the formula takes into account document content, the document content including at least one of: page coverage, reprinting of a document, and document type.

8. The method of claim 4, wherein the formula takes into account printer characteristics, the printer characteristics including whether a printer selected for printing is asleep or is awake and at least one of: energy consumption of a printer; and environmental costs associated with consumables for that printer.

9. The method of claim 2, further comprising providing for displaying an icon on a user's display device which indicates at least one of a number of allocated points consumed and a number of allocated points remaining.

10. The method of claim 2, further comprising, prior to f, providing for displaying options available to the user for reducing the cost in points of performing the job.

11. The method of claim 2, wherein the options include at least one organization-sponsored environmentally-related action.

12. A system comprising non-transitory memory which stores instructions for performing the method of claim 2 and a processor in communication with the memory for executing the instructions.

* * * * *